(12) United States Patent
Seaton

(10) Patent No.: US 7,604,682 B2
(45) Date of Patent: Oct. 20, 2009

(54) APPARATUS AND PROCESS FOR THE PURIFICATION OF AIR

(75) Inventor: Paul Seaton, Woking (GB)

(73) Assignee: Air Products & Chemicals, Inc., Allentown, PA (US)

( * ) Notice: Subject to any disclaimer, the term of this patent is extended or adjusted under 35 U.S.C. 154(b) by 590 days.

(21) Appl. No.: 10/544,917

(22) PCT Filed: Feb. 12, 2004

(86) PCT No.: PCT/GB2004/000530

§ 371 (c)(1),
(2), (4) Date: Apr. 27, 2006

(87) PCT Pub. No.: WO2004/073837

PCT Pub. Date: Sep. 2, 2004

(65) Prior Publication Data

US 2006/0230928 A1 Oct. 19, 2006

(30) Foreign Application Priority Data

Feb. 18, 2003 (GB) ................. 0303748.8

(51) Int. Cl.
*B01D 53/02* (2006.01)
(52) U.S. Cl. ............................. 95/96; 96/130
(58) Field of Classification Search ............ 95/96, 95/103, 139; 96/130
See application file for complete search history.

(56) References Cited

U.S. PATENT DOCUMENTS 4,512,779 A * 4/1985 Hay ........................... 95/100
5,133,787 A   7/1992 Diot et al.

FOREIGN PATENT DOCUMENTS

| CN | 1235861 A1 | 11/1999 |
| DE | 19506760 C1 | 1/1996 |
| EP | 0728515 B1 | 2/1996 |
| WO | WO 00/59826 | 10/2000 |

OTHER PUBLICATIONS

International Search Report for PCT/GB2004/000530.

* cited by examiner

*Primary Examiner*—Robert A Hopkins
(74) *Attorney, Agent, or Firm*—Caesar Rivise Bernstein Cohen & Pokotilow Ltd.

(57) ABSTRACT

A gas purification unit includes a gas purification vessel (12) and at least one of inlet conduit means (18, 20, 34) for connecting a feed gas source (16) to the gas purification vessel and outlet conduit means (36, 22, 24) for connecting the gas purification vessel (12) to at least one downstream gas processing unit. Each of said inlet and outlet conduit means includes at least two subsidiary pipes arranged in parallel and a common pipe (34, 36), each subsidiary pipe being in fluid flow communication with the common pipe and having a flow control valve (18, 20, 22, 24) operating in unison with the flow control valve of the or each other subsidiary pipe. The use of at least two valves in unison increases the reliability of the unit. The use of at least two smaller valves in place of a single large valve also increases the reliability.

20 Claims, 2 Drawing Sheets

APPARATUS AND PROCESS FOR THE PURIFICATION OF AIR

BACKGROUND OF THE INVENTION

The present invention relates to a gas purification unit. The invention has particular application to the purification of air upstream of a cryogenic air separation system. Typically, the invention is used in conjunction with an adsorption process such as a temperature swing adsorption ("TSA") process or pressure swing adsorption ("PSA") process.

Where a feed gas is to be subjected to downstream processing, it may often be desirable or necessary to remove certain components from the feed gas prior to such processing. As an example, high boiling materials, e.g. water and carbon dioxide, which may be present in a feed gas, e.g. air, must be removed where the mixture is to be treated in a low temperature, e.g. cryogenic, process. If relatively high boiling materials are not removed, they may liquefy or solidify in subsequent processing and lead to pressure drops, flow difficulties or other disadvantages in the downstream process. Hazardous, e.g. explosive, materials should be removed prior to further processing of the feed gas so as to reduce the risk of build-up in the subsequent process thereby presenting a hazard. Hydrocarbon gases, e.g. acetylene, may present such a hazard.

In an air separation process, air is typically compressed using a main air compressor ("MAC") and the resultant compressed air is cooled and fed to a separator where condensed water is removed. The compressed air may be further cooled using, for example, refrigerated ethylene glycol. The bulk of the water is removed in this step by condensation and separation of the condensate. The resultant substantially water-free air is typically then fed to an adsorption process, where the components to be removed from the air are removed by adsorption, and then to an air separation unit. In treating air, water is conventionally removed first and then carbon dioxide by passing the air though a single adsorbent layer or separate layers of adsorbent for preferential adsorption of water and carbon dioxide prior to feeding the air to the downstream separation process.

Several processes are known for removing an undesired component from a feed gas by adsorption on a solid adsorbent including TSA and PSA processes. Conventionally in such processes, two (or more) adsorbent beds are employed in parallel arrangement with one bed being regenerated "off-line" while the or each other bed is operated for adsorption. The roles of the beds are then periodically changed in the operating cycle. An adsorption bed is said to be "on-line" during the adsorption step.

In a TSA process, the adsorption step generates heat of adsorption causing a heat pulse to progress downstream through the adsorbent bed. The heat pulse is allowed to proceed out of the downstream end of the adsorbent bed during the feed or on-line period. After adsorption, the flow of feed gas is shut off from the adsorbent bed which is then depressurised. The adsorbent is then exposed to a flow of hot regeneration gas, typically a waste stream or other gas from a downstream process, which strips the adsorbed materials from the adsorbent and so regenerates it for further use. Regeneration conventionally is carried out in a direction counter to that of the adsorption step. The bed is then re-pressurised in readiness to repeat the adsorption step.

A PSA system typically involves a cycle in which the bed is on-line, and then depressurised, regenerated and then re-pressurised before being taken back on-line. Depressurisation involves releasing pressurised gas and leads to waste, generally known as "switch loss". In PSA systems, the pressure of the regeneration gas is lower than that of the feed gas. It is this change in pressure that is used to remove the adsorbed component from the adsorbent. However, cycle times are usually short, for example of the order of 15 to 30 minutes, as compared with those employed in a TSA system which may be for example of the order of 2 to 20 hours.

Gas to be purified is usually fed to a gas purification unit, such as a vessel containing at least one adsorption bed, via inlet conduit means comprising a pipe and a flow control valve. Similarly, purified gas is usually removed from the gas purification unit via outlet conduit means comprising a pipe and a flow control valve. If the flow control valve of either the inlet conduit means or the outlet conduit means fails, then the flow of gas through the gas purification unit will be restricted (if the valve fails in a partially open position) or prevented (if the valve fails in the closed position) thereby reducing or completely stopping gas throughput through the unit.

It is known to bypass a control valve in the event that the control valve fails. For example, DE-C-195 06 760 discloses a PSA system in which the outlet end of the adsorber unit is connected via a common line to at least tour pressure balancing or purging lines which are isolated from the adsorber unit using open/shut valves. Control of the pressure balancing or purging lines is carried out via a first control valve in the common line. There is a reserve control valve arranged in parallel with the first control valve in a bypass line so that, even in the event of failure of the first control valve, "continued operation" of the PSA process is possible.

The pipes to and from the gas purification unit have to be rated proportionally to the capacity of the unit to allow the appropriate gas flow through the unit. It necessarily follows, therefore, that larger gas purification units require pipes having larger diameters than pipes to and from smaller gas purification units.

The size of the flow control valve must be appropriate to the size of the pipe with which it is associated. Butterfly valves are often used to control the gas flow through pipes to and from gas purification units. A large butterfly valve, e.g. one having a metal disc diameter of 100 cm. requires a powerful actuator to open and close the valve. The actuator must not only be able to move the large metal disc between the open and closed positions, but it must also be able to move the disc quickly and frequently during the adsorption/de-adsorption cycle of an adsorbent bed gas purification unit. For example, in a PSA process, the valve must be able to move from the fully open position to the closed position in about 1 or 2 seconds. Such powerful actuators are prone to breakdown as a result of, for example, bearing, seat or disc failure. Consequently, the reliability of a valve decreases as the size of the valve increases. In addition, the cost of a valve increases disproportionately as the size of the valve increases above a certain size.

BRIEF SUMMARY OF THE INVENTION

It is, therefore, an object of preferred embodiments of the present invention to increase the reliability of valves used to control gas flow into and out of a gas purification unit such as a vessel having at least one adsorbent bed. In addition, it as a further objective of preferred embodiments of the present invention to reduce the capital and operational costs associated with gas purification units.

According to a first aspect of the present invention, there is provided a gas purification unit comprising a gas purification vessel and at least one of inlet conduit means for connecting a feed gas source to the gas purification vessel and outlet conduit means for connecting the gas purification vessel to at least one downstream gas processing unit, each of said inlet and outlet conduit means comprising at least two subsidiary pipes arranged in parallel and a common pipe, each subsidiary pipe being in fluid flow communication with the respective common pipe and having a flow control valve operating in unison with the flow control valve of the or each other respective subsidiary pipe.

The flow control valves of the inlet conduit means or the outlet conduit means operate "in unison", by which is meant they are operationally interrelated such that each valve opens and closes simultaneously and in phase. The flow control valves may be directly linked mechanically to each other or may be controlled individually.

One advantage of this arrangement is that, if one valve were to fail (and be forced closed if it failed in an at least partially open position in line with common practice), then there is no total loss of gas throughput through the purification unit which improves the operational effectiveness of the unit. The chance of each valve failing at the same time is significantly less than that of single valve failure. In this way, reliability of the unit is improved in contrast to the commonly held belief that reliability of a system decreases as the number of components in that system increases.

The flow control valves of a gas purification unit having multiple adsorbent beds do not usually operate to provide a variable gas flow. Instead, they usually operate as "switch valves", that is to say that they operate either fully open or fully closed.

In preferred embodiments, the diameter of each subsidiary pipe is less than the diameter of the common pipe and the flow capacity of each flow control valve is less than the flow capacity of the common pipe. It is well know in the art that smaller valves are inherently more reliable than larger valves. Therefore, not only is reliability improved by using two valves, in preferred embodiments, reliability is further improved by using smaller valves. In addition, the use of smaller valves saves significant capital and operating cost when compared with the use of larger valves.

The total cross-sectional area of the subsidiary pipes is usually at least equal to the cross-sectional area of the common pipe. For a given gas purification vessel, such an arrangement provides a total gas flow to or from the vessel that is at least equal to the corresponding gas flow using conventional inlet or outlet conduit means.

The gas purification unit may comprise either inlet conduit means or outlet conduit means having the multiple valve arrangement of the present invention. However, in preferred embodiments, the gas purification unit comprising both inlet and outlet conduit means.

The common pipe preferably connects the subsidiary pipes to the gas purification vessel. In such embodiments, the unit may further comprise an upstream single supply pipe in fluid flow communication with each subsidiary pipe of the inlet conduit means. The diameter of the supply pipe is about the same as the diameter of the common pipe. Additionally or alternatively, the unit may further comprise a downstream single outlet pipe in flow communication with each subsidiary pipe of the outlet conduit means. The diameter of said outlet pipe is about the same as the diameter of the common pipe.

The gas purification unit as described above is particularly suited for use in the purification of air. Such an air purification unit comprises an air purification vessel which usually comprises at least one adsorbent bed for removing a component such as carbon dioxide and/or water from the air.

According to a second aspect of the present invention, there is provided a gas purification system comprising at least two gas purification units according to the first aspect in parallel and in fluid flow communication with each other. Such a gas purification system may be used to purify air upstream of a cryogenic air separation unit. In these embodiments, each gas purification unit is an air purification unit.

According to a third aspect of the present invention, there is provided a cryogenic air separation system comprising a gas purification system according to the second aspect and at least one downstream cryogenic air separation unit, said gas purification system being in fluid flow communication with said cryogenic air separation unit.

According to a fourth aspect of the present invention, there is provided a process for purifying air for cryogenic separation comprising:

feeding air to a gas purification unit according the first aspect;

purifying said air in said gas purification unit to produce purified air; and feeding purified air to at least one cryogenic air separation unit, said process being characterised in that:

feed air flow to the gas purification unit is controlled by at least two parallel flow control valves operating in unison, and/or purified air flow from the gas purification unit is controlled by at least two parallel flow control valves operating in unison.

According to a fifth aspect of the present invention, there is provided use of at least one gas purification unit according to the first aspect in a TSA process for the purification of air.

According to a sixth aspect of the present invention, there is provided use of at least one gas purification unit according to the first aspect in a PSA process for the purification of air.

BRIEF DESCRIPTION OF SEVERAL VIEWS OF THE DRAWINGS

The following is a description, by way of example only and with reference to the accompanying drawings, of presently preferred embodiments of the invention. In the drawings.

DETAILED DESCRIPTION OF THE INVENTION

Figure 1:
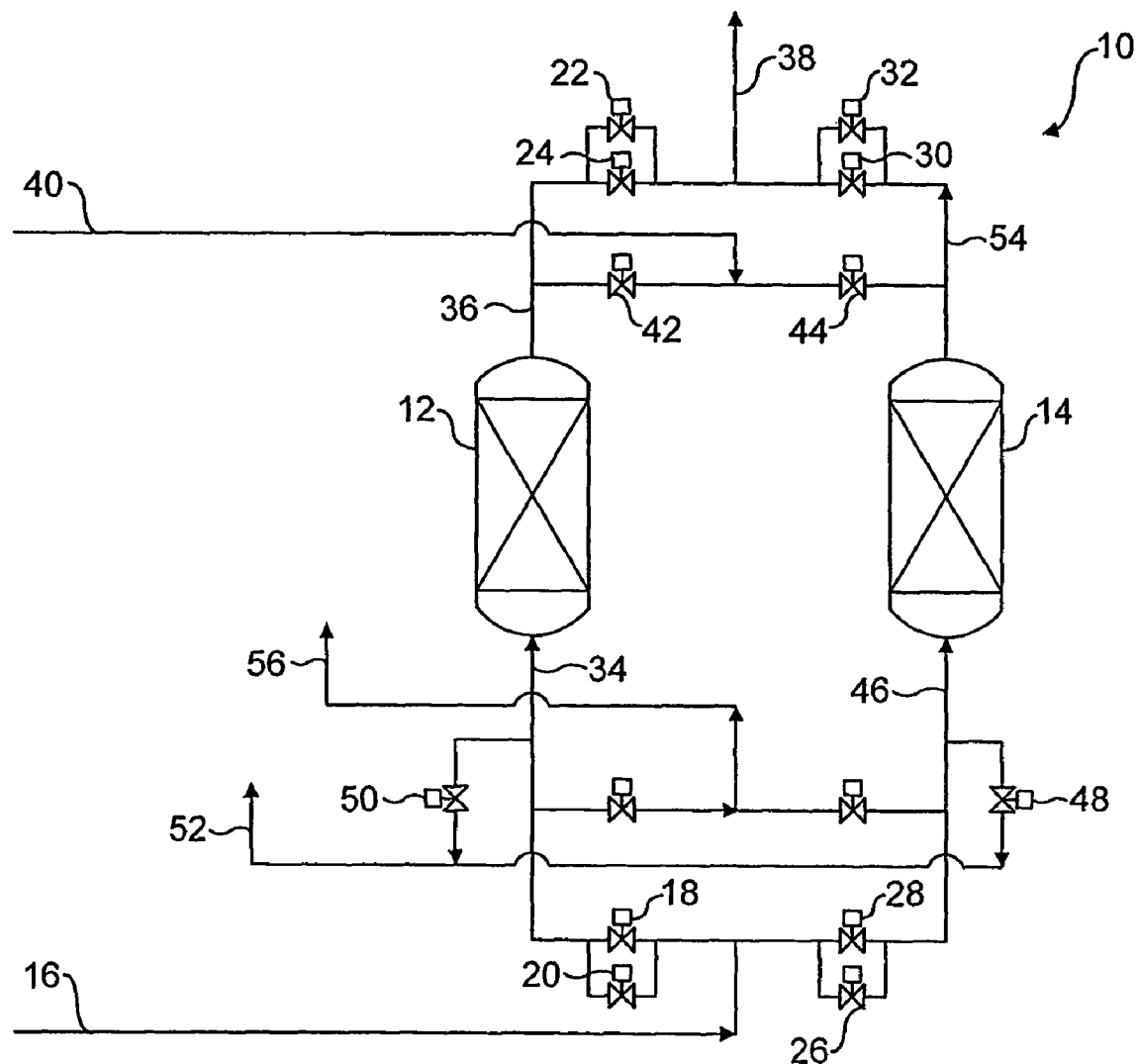
FIG. 1 is a schematic representation of a first embodiment of the first aspect of the present invention as part of an air purification system involving two air purification units in parallel.

Referring to FIG. 1, the air purification system 10 comprises two air purification vessels 12, 14. Each vessel comprises at least one bed of adsorbent material (not shown) and, while the first vessel 12 is on-line adsorbing a component from the air, the second vessel 14 is off-line with its adsorbent being regenerated. After regeneration is complete, the roles of the two vessels are reversed with the first vessel 12 going off-line for regeneration and the second vessel 14 coming on-line for adsorption. This cycle is repeated to maintain a continuous purification process.

The adsorption/regeneration cycle involves introducing air to be purified to the system 10 via line 16. When the first vessel 12 is on-line, the first and third pairs of air flow control valves 18, 20 and 22, 24 are open and the second and fourth pairs of air flow control valves 26, 28 and 30, 32 are closed. Air is fed via line 16 to the first pair of valves 18, 20. The air stream is divided into two equal portions, the first portion passing through valve 18 and the second portion passing through valve 20. The two portions are then recombined and fed via line 34 to the first air purification vessel 12. The air is passed over the adsorbent material in the first vessel 12 and water and/or carbon dioxide are removed by adsorption. Substantially carbon dioxide-free air is removed from the first vessel via line 36 and divided into two equal portions. The first portion passes through valve 22 and the second portion passes through valve 24. The two portions are combined and the purified air removed from the purification system via line 38. The purified air is fed to a cryogenic air separation system (not shown).

During the period when the first vessel 12 is on-line, regeneration gas is fed via line 40 through regeneration gas flow control valve 44 to the second vessel 14. Regeneration gas flow control valve 42 is closed. The absorbent material (not shown) in the second vessel 14 is regenerated and the spent regeneration gas removed from the second vessel 14 via line 46. Regeneration gas flow control valve 48 is open and, with regeneration gas flow control valve 50 being closed, the spent regeneration gas is removed from the system via line 52.

In order to take the first vessel 12 off-line and to put the second vessel 14 on-line, air flow control valves 18, 20 and 22, 24 are closed and air flow control valves 26, 28 and 30, 32 are opened. Regeneration gas flow control valves 44, 48 are closed and regeneration flow control valves 42, 50 are opened. Depressurisation line 56 is used to release the initial pressure in the first vessel 12 (or second vessel 14) before the vessel goes into its regeneration phase. It is smaller than the regeneration vent system in order to give a more controlled rate of pressure reduction so that the risk of damaging the adsorbent material is reduced.

When the second vessel 14 is on-line, the first and third pairs of air flow control valves 18, 20 and 22, 24 are closed and the second and fourth pairs of air flow control valves 26, 28 and 30, 32 are open. Air is fed via line 16 to the second pair of valves 26, 28. The air stream is divided into two equal portions, the first portion passing through valve 26 and the second portion passing through valve 28. The two portions are then recombined and fed via line 46 to the second air purification vessel 14. The air is passed over the adsorbent material in the second vessel 14 and carbon dioxide is removed by adsorption. Substantially carbon dioxide-free air is removed from the second vessel 14 via line 54 and divided into two equal portions. The first portion passes through valve 30 and the second portion passes through valve 32. The two portions are combined and the purified air removed from the purification system via line 38. The purified air is fed to a cryogenic air separation system (not shown).

During the period when the second vessel 14 is on-line, regeneration gas is fed via line 40 through regeneration gas flow control valve 42 to the first vessel 12. Regeneration gas flow control valve 44 is closed. The absorbent material (not shown) in the first vessel 12 is regenerated and the spent regeneration gas removed from the first vessel 12 via line 34. Regeneration gas flow control valve 50 is open and, with regeneration gas flow control valve 48 being closed, the spent regeneration gas removed from the system via line 52.

Conventionally, air flow to or from an adsorption vessel is controlled by a single flow control valve. However, in the exemplified embodiment of the present invention, the single valve has been replaced by a pair of smaller flow control valves arranged in parallel. The two valves in each pair are operationally interrelated with each other such that they both open and close simultaneously in unison. If one valve should fail, then it is usually forced closed (if failure occurs with the valve in an at least partially open position). However, the other valve of the pair would be operation and, thus, air flow through the adsorption vessel would be reduced but not totally interrupted. The reliability of the purification system is thereby increased despite have a larger number of components.

Figure 2:
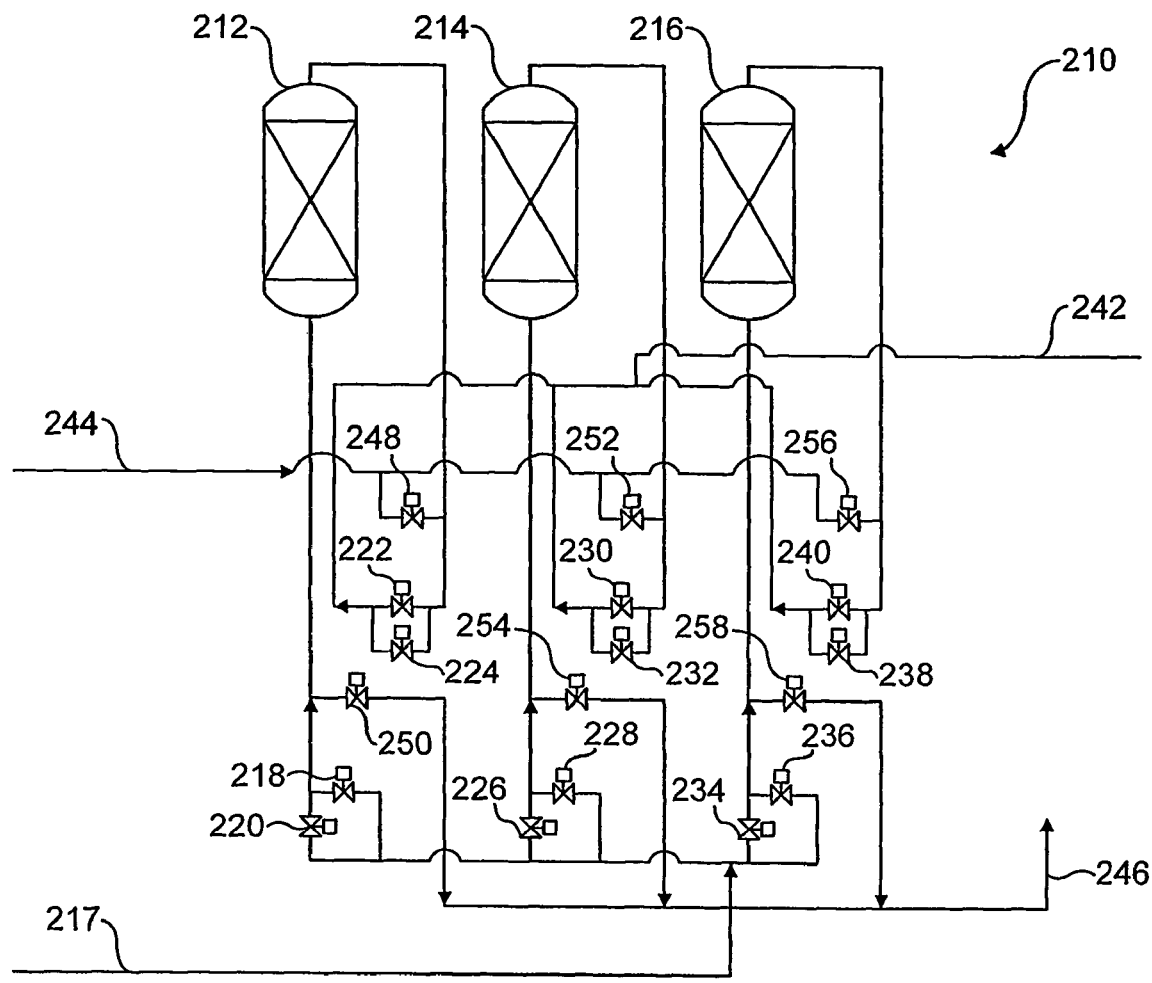
FIG. 2 is a schematic representation of the embodiment depicted in FIG. 1 as part of an air purification system involving three air purification units in parallel.

Referring to FIG. 2, the air purification system 210 comprises three air purification vessels 212, 214, 216. Each vessel comprises at least one bed of adsorbent material (not shown) and, in operation, the first and second vessels 212, 214 are on-line while the adsorbent material in the third vessel 216 is being regenerated. After regeneration of the adsorbent material in the third vessel 216 is complete, the third vessel 216 comes on-line along side the second vessel 214 and the first vessel 212 goes off-line for regeneration. After regeneration of the adsorbent material in the first vessel 212 is complete, the first vessel 212 comes on-line along side the third vessel 216 and the second vessel 214 goes off-line for regeneration. After regeneration of the adsorbent material in the second vessel 214 is complete, the second vessel 214 comes on-line along side the first vessel 212 and the third vessel 216 goes off-line for regeneration. This cycle is repeated to maintain a continuous purification process.

Air is fed to the purification system via line 217 and purified air removed from the system via line 242. The purified air is fed to a cryogenic air separation unit (not shown). Regeneration gas is fed to the system via line 244 and spent regeneration gas removed via line 246. Flow control valves 248, 250, 252, 254, 256, 258 control the flow of regeneration gas through the purification system and are opened and closed periodically in a conventional sequence analogous to that described for the two adsorption vessel system depicted in FIG. 1.

The first vessel 212 has a first pair of air flow control valves 218, 220 which control the flow of air into the vessel and a second pair of air flow control valves 222, 224 which control the flow of air out of the vessel. The two pairs of flow control valves 226, 228 and 230, 232 control the flow of air through the second vessel 214 and the two pairs of flow control valves 234, 236 and 238, 240 control the flow of air through the third vessel 216. The two valves in each pair are operationally interrelated with each other such that they both open and close simultaneously in unison. If one valve should fail (and be forced closed if valve failure occurs in an at least partially open position), air flow through the respective vessel would be reduced but not totally interrupted. The reliability of the purification system as a whole is thereby increased despite having a larger number of components than a conventional three-vessel purification system.

Throughout the specification, the term "means" in the context of means for carrying out a function, is intended to refer to at least one device adapted and/or constructed to carry out that function.

It will be appreciated that the invention is not restricted to the details described above with reference to the preferred embodiments but that numerous modifications and variations can be made without departing from the spirit or scope of the invention as defined by the following claims.

The invention claimed is:

1. A gas purification unit comprising:
   a gas purification vessel;
   an inlet conduit means for connecting a feed gas source to the gas purification vessel; and
   an outlet conduit means for connecting the gas purification vessel to at least one downstream gas processing unit,
   wherein at least one of the inlet conduit means and the outlet conduit means comprises:

at least two subsidiary pipes arranged in parallel; and
a common pipe,
wherein each subsidiary pipe is in fluid flow communication with the common pipe and has a flow control valve, and wherein the flow control valves of the subsidiary pipes operate in unison, and
wherein the diameter of each subsidiary pipe is less than the diameter of the common pipe and the flow capacity of each flow control valve is less than the flow capacity of the common pipe.

2. A gas purification unit as claimed in claim 1, wherein the common pipe connects the subsidiary pipes to the gas purification vessel.

3. A gas purification unit as claimed in claim 2, further comprising an upstream single supply pipe in fluid flow communication with each subsidiary pipe of the inlet conduit means.

4. A gas purification unit as claimed in claim 2, further comprising a downstream single outlet pipe in fluid flow communication with each subsidiary pipe of the outlet conduit means.

5. A gas purification unit as claimed in claim 1, wherein each of the inlet and outlet conduit means comprises two subsidiary pipes.

6. A gas purification unit as claimed in claim 1, wherein the gas purification unit is an air purification unit.

7. A gas purification system comprising at least two gas purification units as defined in claim 1 in parallel and in fluid flow communication with each other.

8. A gas purification system as claimed in claim 7, wherein each gas purification unit is an air purification unit.

9. A cryogenic air separation system comprising a gas purification system as defined in claim 8 and at least one downstream cryogenic air separation unit, the gas purification system being in fluid flow communication with the cryogenic air separation unit.

10. A process for purifying air for cryogenic separation comprising:
feeding air to a gas purification unit as defined in claim 6;
purifying the air in the gas purification unit to produce purified air; and
feeding purified air to at least one cryogenic air separation unit,
the process being characterised in that: feed air flow to the gas purification unit is controlled by at least two parallel flow control valves operating in unison, and/or purified air flow from the gas purification unit is controlled by at least two parallel flow control valves operating in unison.

11. A gas purification unit comprising:
a gas purification vessel;
an inlet conduit means for connecting a feed gas source to the gas purification vessel; and
an outlet conduit means for connecting the gas purification vessel to at least one downstream gas processing unit,
wherein at least one of the inlet conduit means and the outlet conduit means comprises:
at least two subsidiary pipes arranged in parallel; and
a common pipe,
wherein each subsidiary pipe is in fluid flow communication with the common pipe and has a flow control valve, and wherein the flow control valves of the subsidiary pipes operate in unison, and
wherein the total cross-sectional area of the subsidiary pipes is at least equal to the cross-sectional area of the common pipe.

12. A gas purification unit as claimed in claim 11, wherein the common pipe connects the subsidiary pipes to the gas purification vessel.

13. A gas purification unit as claimed in claim 12, further comprising an upstream single supply pipe in fluid flow communication with each subsidiary pipe of the inlet conduit means.

14. A gas purification unit as claimed in claim 12, further comprising a downstream single outlet pipe in fluid flow communication with each subsidiary pipe of the outlet conduit means.

15. A gas purification unit as claimed in claim 11, wherein each of the inlet and outlet conduit means comprises two subsidiary pipes.

16. A gas purification unit as claimed in claim 11, wherein the gas purification unit is an air purification unit.

17. A gas purification system comprising at least two gas purification units as defined in claim 11 in parallel and in fluid flow communication with each other.

18. A gas purification system as claimed in claim 17, wherein each gas purification unit is an air purification unit.

19. A cryogenic air separation system comprising a gas purification system as defined in claim 18 and at least one downstream cryogenic air separation unit, the gas purification system being in fluid flow communication with the cryogenic air separation unit.

20. A process for purifying air for cryogenic separation comprising:
feeding air to a gas purification unit as defined in claim 16;
purifying the air in the gas purification unit to produce purified air; and
feeding purified air to at least one cryogenic air separation unit,
the process being characterised in that: feed air flow to the gas purification unit is controlled by at least two parallel flow control valves operating in unison, and/or purified air flow from the gas purification unit is controlled by at least two parallel flow control valves operating in unison.

* * * * *